United States Patent
Witek et al.

[11] Patent Number: 5,882,213
[45] Date of Patent: Mar. 16, 1999

[54] BATTERY MOUNTED JUNCTION BOX

[75] Inventors: Joseph Witek, Novi; George A. Wooldridge, Warren, both of Mich.

[73] Assignee: UT Automotive Dearborn, Inc., Dearborn, Mich.

[21] Appl. No.: 943,781

[22] Filed: Oct. 3, 1997

[51] Int. Cl.$^6$ ..................................................... K01R 9/09
[52] U.S. Cl. ........................................... 439/76.2; 439/755
[58] Field of Search .................................... 439/765, 76.2, 439/629, 949, 766, 754, 755, 763, 522

[56] References Cited

U.S. PATENT DOCUMENTS

| | | | |
|---|---|---|---|
| 3,775,730 | 11/1973 | Rowls et al. ............................. | 439/765 |
| 4,575,178 | 3/1986 | Coesfeld et al. ......................... | 439/765 |
| 5,229,922 | 7/1993 | Muramatsu et al. .................... | 439/76.2 |
| 5,645,448 | 7/1997 | Hill ......................................... | 439/763 |

Primary Examiner—Neil Abrams
Assistant Examiner—T. C. Patel
Attorney, Agent, or Firm—Howard & Howard

[57] ABSTRACT

A junction box has a housing mounted directly to a battery. The junction box includes a terminal that mounts to the post of the battery and secures the housing to the battery. Enclosed within the housing is a printed circuit board for receiving outputs from the terminal and distributing electrical power to a second set of outputs, which can communicate with a wiring harness for further distribution of the electrical power.

14 Claims, 2 Drawing Sheets

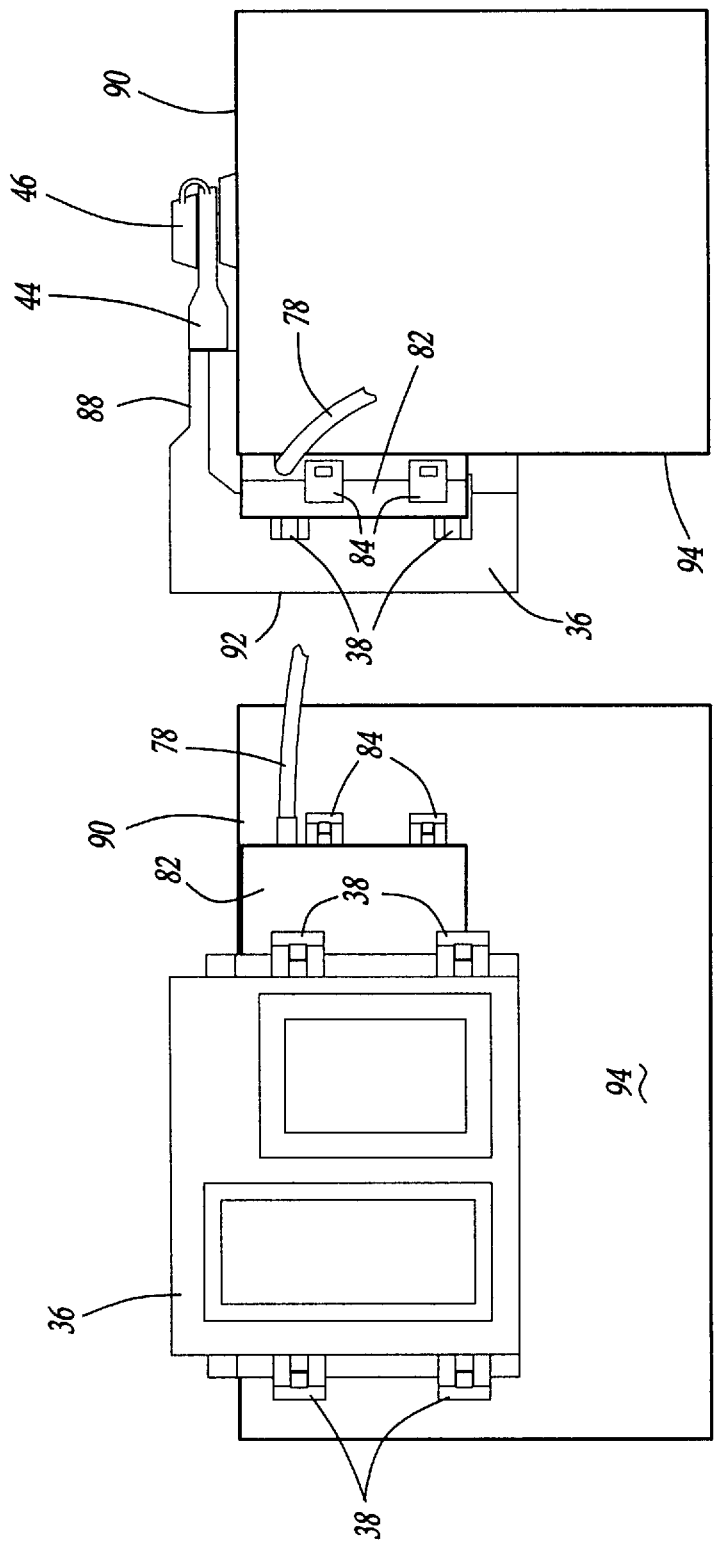

BATTERY MOUNTED JUNCTION BOX

BACKGROUND OF THE INVENTION

This invention relates generally to a vehicle electrical junction box that is mounted to a battery.

Modern vehicles are provided with many electrical systems and components. All of these draw power from the battery. Typically, a battery cable has supplied electrical power from the battery to a remote junction box. The junction box typically includes appropriate controls and connections to distribute the electrical power as appropriate. Wire harnesses are attached to the junction box to communicate to the electrical systems and components.

In most vehicles the junction box is mounted to a wall in an engine compartment or to an interior sidewall of a passenger compartment. Generally, a terminal is mounted to a post of a battery and the battery cable connects the terminal to the junction box. Oftentimes, the junction boxes are located in places which are not conveniently accessible. In addition, the typical placement of the junction box requires long cable runs between the battery and the junction box and from the junction box to electrical components within the vehicle.

Therefore, it is desirable to provide a junction box that is located closely adjacent to the battery to reduce the length of cable required to distribute power from the battery to the electrical systems and to provide easier access to the junction box. This invention permits a junction box to be mounted directly to a battery, thereby eliminating the need to include a battery cable extending between the terminal and the junction box. The invention also provides a more convenient location for the junction box.

SUMMARY OF THE INVENTION

In general terms, this invention provides a means for mounting a junction box adjacent to a battery. In essence, the junction box includes a plurality of electrical outlets for receiving the electrical output from a terminal connected to a battery. The junction box is attached to the battery through a terminal. Preferably, the terminal and the outputs are formed as a single rigid piece. Moreover, the junction box is preferably mounted and supported directly on the battery.

Preferably, the terminal is mounted to a battery post of the battery to secure the junction box. The plurality of electrical outputs are coupled to a printed circuit board for distribution of the electrical power. A second plurality of outputs directs the electrical power from the printed circuit board to wiring harnesses for further distribution of the electrical power. The printed circuit board and at least a portion of the terminal are preferably enclosed within a sealed housing. The housing is secured closely adjacent to the battery by the terminal, and is preferably supported on the battery.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 2 is an end view of a battery mounted junction box designed according to this invention; and FIG. 3 is a side view of a battery mounted junction box designed according to this invention.

DETAILED DESCRIPTION OF THE PREFERRED EMBODIMENT

Figure 1:
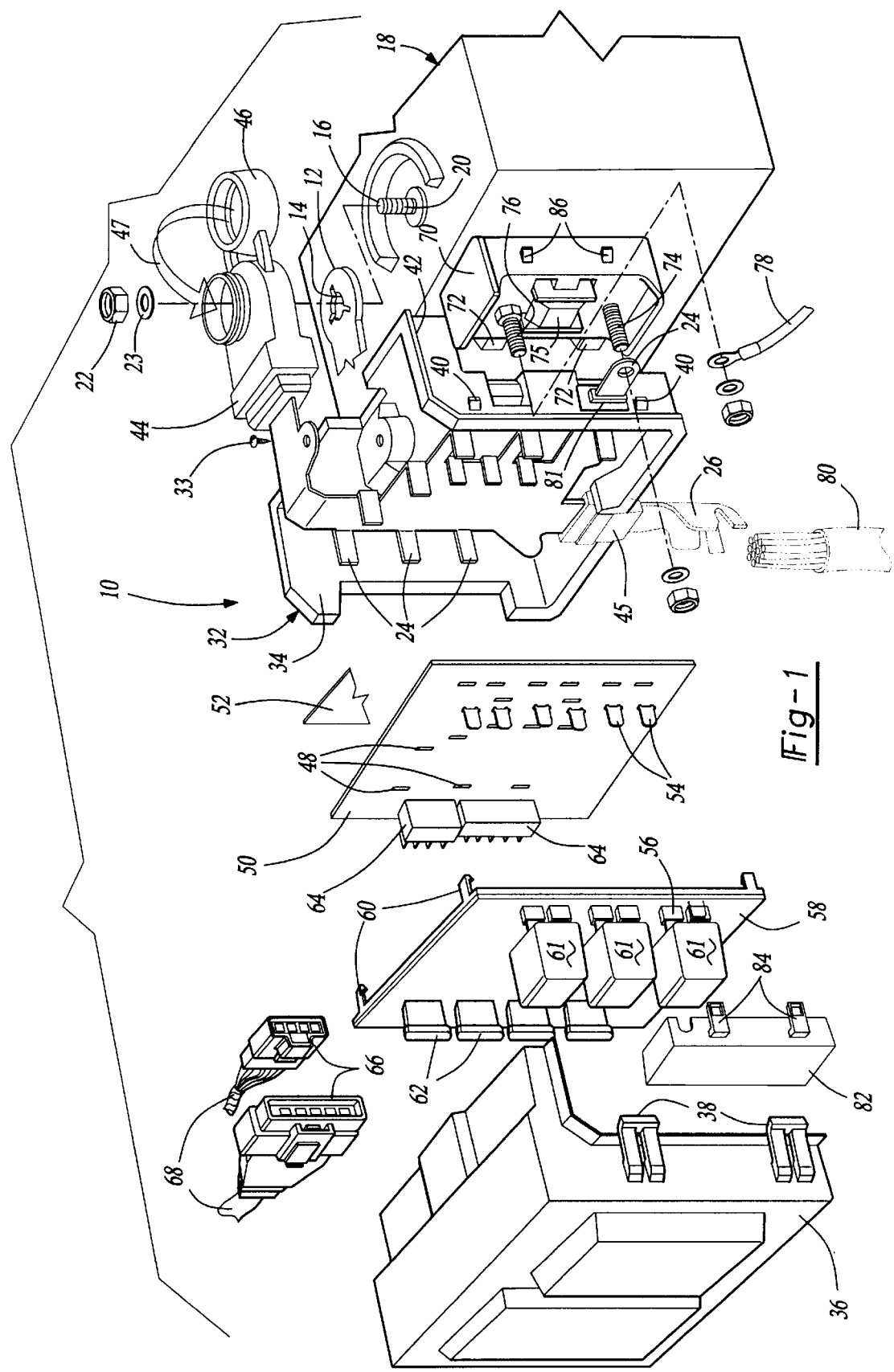
FIG. 1 is an exploded side view of a battery mounted junction box designed according to this invention.

The present invention is directed to a unique mounting system for a junction box for distributing power from a vehicle battery. One particular junction box will be disclosed, however, it should be understood that other junction boxes would come within the scope of this invention.

A battery mounted junction box is generally indicated at 10 in FIG. 1. A terminal 12 having a hole 14 is mounted to a post 16 on battery 18. Terminal 12 is illustrated positioned below a sealing boot 44. In practice terminal 12 is actually mounted in sealing boot 44. The post 16 has a set of external threads 20 adapted to receive a nut 22 and a washer 23. The nut 22 secures the terminal 12 to the post 16 of the battery 18. The terminal 12 extends to a series of electrical outputs 24 and an optional connector 26. The outputs 24 and connector 26 serve to distribute the power from battery 18 to the electrical systems and components. The terminal 12 is shown as being generally rigid and L-shaped. However, as will be appreciated by those skilled in the art, the terminal 12 could be of a variety of other shapes. In addition, the terminal 12 need not be a single rigid piece, as shown. The terminal 12 extends from the post 16 into a first housing 32. A screw 33 secures the terminal 12 to the first housing 32.

The first housing 32 includes a first half 34 which is matable with a second half 36. A pair of clips 38 are mounted on two opposite sides of the second half 36, and snap fit over a pair of posts 40 on corresponding sides of the first half 34 to secure the first half 34 to the second half 36. As will be appreciated by one of ordinary skill in the art, other ways could be used to secure the first half 34 to the second half 36. A sealing lip 42 surrounds the first half 34 and seals the first housing 32 when the first half 34 and the second half 36 are secured to each other. A sealing boot 44 seals terminal 12 from post 16 to first half 34 of first housing 32. Another sealing boot 45 seals terminal 12 at connector 26 when connector 26 is included. Boots 44 and 45 are preferably made of silicone and in combination with the sealing lip 42, seal the first housing 32 when the first half 34 is mated with the second half 36. Sealing boot 44 also includes a cap 46 positioned to cover the nut 22 and washer 23, as shown by arrow 47, when the terminal 12 is secured to the post 16.

Some of the electrical outputs 24 of the terminal 12 plug into a set of terminals 48 in a printed circuit board 50. An insulation spacer 52, partially illustrated, is sandwiched between the terminal 12 and the printed circuit board 50. A set of printed circuit board blades 54 extend from the printed circuit board 50 into a set of terminals 56 mounted to a dielectric carrier board 58. A series of clips 60 snap fit the dielectric carrier board 58 to the printed circuit board 50. A set of relays 61 and a set of fuses 62 are received in the terminals 56 opposite the printed circuit board blades 54.

A plurality of electrical outputs 64 extend from the printed circuit board 58 through the first housing 32. The electric outputs 64 provide electrical continuity between the printed circuit board 50 and end plugs 66 of wiring harnesses 68.

A second housing 70 includes a pair of snap fit clips 72 that mount the second housing 70 to the first housing 32. Second housing 70 is optional and can be included when terminal 12 does not include connector 26. Either output post 76 or connector 26 is used to distribute electrical power to the engine starter (not shown) and alternator (not shown) through power feed 78 or a power feed 80, respectively.

If housing 70 is used, one electric output 24 of the terminal 12 is secured to an input post 74 mounted to the second housing 70. An electrical power regulation element 75, known as a mega fuse, electrically couples the input post 74 to an output post 76 that is mounted to the second housing 70. A power feed 78 is connected to the output post 76. A sealing boot 81 seals the output 24 from the terminal 12 at the point where it exits the first housing 32 and enters the second housing 70. The sealing boot 81 is preferably made of silicone. A second housing cover 82 has two pairs of clips 84 mounted on opposite sides of the housing cover 82 that snap fit over two pairs of corresponding posts 86 on the second housing 70 to join the cover 82 to the second housing 70. The advantage of including second housing 70 with the power regulation element 75 rather than connector 26 is that it provides a fusible link between the battery 18 and the starter and alternator. When connector 26 is not included then sealing boot 45 is also not included because the terminal 12 ends within the first housing 32. When the second housing 70 and the power regulation element 75 are not included then sealing boot 81 is not necessary because no output 24 extends between the first hosing 32 and the second housing 70.

In FIG. 2 an end view of the battery mounted junction box 10 is shown mounted to the battery 18. As can be appreciated from FIG. 2, the junction box 10 is mounted and supported directly on the battery 18. The terminal 12 connects the junction box 10 to the battery 18 and secures the junction box 10 on the battery 18. However, the junction box 10 is itself supported on the top surface 90 and side surface 94 of the battery.

In FIG. 3, a side view of the battery mounted junction box 10 is shown mounted on the battery 18. In this embodiment, the first housing 32 is substantially L-shaped and a shorter portion 88 of the first housing 32 is supported on a top surface 90 of the battery 18. A longer portion 92 of the first housing 32 contacts a side surface 94 of the battery 18.

As will be appreciated by one of ordinary skill in the art, the shape of the first housing 32 could be rectangular rather than L-shaped as shown in the embodiment in FIG. 3. In addition, the post 16 of the battery 18 could be mounted on the side surface 94 of the battery 18 rather than the top surface 90 of the battery 18.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A battery mounted junction box comprising:
    a terminal communicating with a plurality of electrical outputs and mountable to a post of a battery;
    a printed circuit board, said printed circuit board electrically connected to a plurality of said plurality of electrical outputs;
    a first housing enclosing said plurality of said electrical outputs, said circuit board, and at least a portion of said terminal; and
    said terminal securing said first housing to a battery.

2. A battery mounted junction box as recited in claim 1, wherein said printed circuit board further includes a plurality of electrical outputs.

3. A battery mounted junction box as recited in claim 1, wherein said first housing includes a sealing lip and said terminal is received in a sealing boot.

4. A battery mounted junction box as recited in claim 1, wherein said first housing is supported on the battery.

5. A battery mounted junction box as recited in claim 1, further including a second housing having a housing cover and secured by said first housing adjacent to the battery, said second housing receiving at least one of said plurality of electrical outputs from said terminal.

6. A battery mounted junction box as recited in claim 1, wherein said terminal and said plurality of electrical outputs are formed as a single rigid part.

7. A battery mounted junction box as recited in claim 1 wherein said terminal further includes a plurality of sealing boots and said first housing further includes a sealing lip; and
    said plurality of sealing boots and said sealing lip sealing said first housing.

8. A battery comprising:
    a battery having a post;
    a terminal having a plurality of sealing boots, a plurality of electrical outputs, and mountable to said post, said terminal electrically connected to a printed circuit board;
    a first housing enclosing said circuit board, a plurality of said electrical outputs and a portion of said terminal, said plurality of sealing boots sealing said first housing; and said first housing having a substantially L-shape and contacting two adjacent sides of said battery, said first housing secured to said post by said terminal and supported on said battery.

9. A battery as recited in claim 8, wherein said terminal and said plurality of outputs are formed as a single rigid part.

10. A battery as recited in claim 9, wherein said terminal is substantially L-shaped, with said post being received on one leg of said L-shape, and said plurality of electrical outputs received on the other leg.

11. A battery mounted junction box comprising:
    a battery having a post;
    a terminal having a plurality of electrical outputs projecting from said terminal, and said terminal releasably mounted to said post;
    a printed circuit board having a plurality of terminals, said terminals of said printed circuit board receiving a plurality of said electrical outputs of said terminal, said printed circuit board including electrical output terminals; and
    a first housing enclosing said printed circuit board and at least a portion of said terminal, said first housing secured to said post and adjacent said battery by said terminal.

12. A battery mounted junction box as recited in claim 11, further including a second housing secured adjacent to said battery by one of said terminal or said first housing, said second housing receiving at least one of said plurality of electrical outputs from said terminal.

13. A battery mounted junction box as recited in claim 12, wherein said second housing further includes an electrical power regulation element connected to a power feed and to said at least one of said plurality of electrical outputs from said terminal.

14. A battery mounted junction box as recited in claim 11 wherein said terminal further includes a plurality of sealing boots, said plurality of sealing boots and said first housing sealingly enclosing said printed circuit board and at least a portion of said terminal.

* * * * *